United States Patent [19]
Chatterjee et al.

[11] Patent Number: 5,859,833
[45] Date of Patent: Jan. 12, 1999

[54] OPTICAL DISK GRADE COPOLYESTERCARBONATES DERIVED FROM HYDROXYPHENYLINDANOLS

[75] Inventors: Gautam Chatterjee, Clifton Park; Gary Charles Davis, Albany, both of N.Y.

[73] Assignee: General Electric Company, Schenectady, N.Y.

[21] Appl. No.: 927,136

[22] Filed: Sep. 2, 1997

[51] Int. Cl.$^6$ .............................. G11B 3/70; C08G 64/00
[52] U.S. Cl. .............................. 369/288; 528/10; 528/26; 528/29; 528/86; 528/176; 528/193; 528/201; 528/204; 528/206; 528/219; 525/474
[58] Field of Search .............................. 528/86, 10, 176, 528/193, 204, 201, 206, 26, 219, 29; 525/474; 369/288

[56] References Cited

U.S. PATENT DOCUMENTS

| | | | |
|---|---|---|---|
| 3,288,864 | 11/1966 | Farnham | 568/720 |
| 4,948,871 | 8/1990 | Fukuoka et al. | 528/481 |
| 4,950,731 | 8/1990 | Faler et al. | 528/201 |
| 4,988,785 | 1/1991 | Paul | 526/259 |
| 5,204,377 | 4/1993 | Fukawa et al. | 521/60 |
| 5,266,659 | 11/1993 | Sivaram et al. | 525/463 |
| 5,288,838 | 2/1994 | Sivaram et al. | 528/199 |

OTHER PUBLICATIONS

"Polymerization by Phase Transfer Catalysis", by L. H. Tagle et al., Polymer Bulletin 28, 645–652 (1992).

*Primary Examiner*—Samuel A. Acquah
*Attorney, Agent, or Firm*—Noreen C. Johnson; Douglas E. Stoner

[57] ABSTRACT

Copolycarbonates having low intrinsic birefringence comprise structural units derived from hydroxyphenylindanol, from resorcinol, alkylenedioic acid or eugenolsiloxane, and, optionally, from a bisphenol, preferably bisphenol A. The copolycarbonates are useful for the fabrication of optical data recording media such as compact disks.

13 Claims, No Drawings

OPTICAL DISK GRADE COPOLYESTERCARBONATES DERIVED FROM HYDROXYPHENYLINDANOLS

CROSS-REFERENCE TO RELATED APPLICATION

This application claims priority from provisional application Ser. No. 60/32,480.

BACKGROUND OF THE INVENTION

This invention relates to copolyestercarbonates, and more particularly copolyestercarbonates useful for the fabrication of optical disks.

Optical data recording media, including optical disks as exemplified by compact audio disks and CD-ROM disks used in computers, have become a major means of storing data and making it available. The data on an optical disk are read by a plane polarized laser beam, associated with a similar reference beam polarized in a perpendicular direction. For accurate reading, it is necessary to minimize differences in phase retardation of these laser beams upon passage through the disk.

In the further development of optical disks, particularly read-write disks and disks capable of storing larger amounts of data, various physical factors become important. One such factor which is closely related to the storage capability of the disk, is its birefringence, i.e., the difference between indices of refraction of light polarized in two directions perpendicular to each other. Birefringence has several components, caused by such factors as molecular structure of the raw material from which the disk is fabricated and degree of molecular orientation therein. "Orientational" or intrinsic birefringence of a polymer, ideally measured after perfect orientation of all polymer molecules by stretching, is a function solely of molecular structure.

It is possible to calculate the theoretical orientational birefringences of various polymers by considering the birefringence values of the monomers used to synthesize the polymer and their volume proportions in the polymer molecule. Thus, by balancing the birefringences of the monomers it is possible to prepare a polymer which theoretically has an orientational birefringence value of 0.

By far the most common polymers employed in optical disks are polycarbonates and copolyestercarbonates. They are peculiarly suited for this purpose by reason of their transparency and favorable physical properties. However, the bisphenol A polycarbonates, which are the principal ones currently being produced, are characterized by very high birefringence.

In U.S. Pat. No. 4,950,731, a series of polycarbonates having very low orientational birefringence is described. Said polycarbonates are typically copolycarbonates comprising structural units derived from 2,2-bis(4-hydroxyphenyl)propane, also known as "bisphenol A", and 6,6'-hydroxy-3,3,3',3'-tetramethyl-1,1'-spiro(bis)indane, hereinafter designated "SBI". These copolycarbonates are suitable in many ways for the fabrication of optical disks. However, there is room for improvement in such areas as hydrolytic stability, processability and ductility.

In particular, the glass transition temperatures of many SBI-bisphenol A copolycarbonates are above 200° C. and they have relatively high melt viscosities. It is generally very difficult to process materials with such properties. To lower the melt viscosity, one can incorporate structural units derived from "soft block" monomers such as resorcinol, dodecanedioic acid or eugenolpolydimethylsiloxane, but in the case of SBI polycarbonates the proportion of "soft block" units may be so high that the melt stability of the polymer is adversely affected.

It is further found that interfacially prepared polycarbonates sometimes have such disadvantages as poor solubility and swelling behavior of SBI in contact with chlorinated solvents such as methylene chloride. The aforementioned patent describes a particular interfacial method which overcomes these disadvantages to some extent. However, it is cumbersome in that it requires several steps.

SUMMARY OF THE INVENTION

The present invention provides a genus of copolyestercarbonates characterized by excellent physical properties, low orientational birefringence and glass transition temperatures below 200° C. Said copolycarbonates may be easily prepared by conventional methods, including interfacial, melt transesterification and redistribution methods.

Accordingly, the invention in one of its aspects includes copolyestercarbonates having low birefringence, said copolycarbonates comprising:

(A) about 20–90 mole percent of structural units of the formula

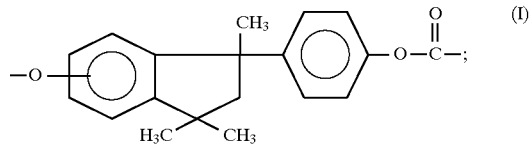

(B) about 3–70 mole percent of structural units of the formula

wherein $R^1$ is alkyleneoxy, m-phenyleneoxy,

or

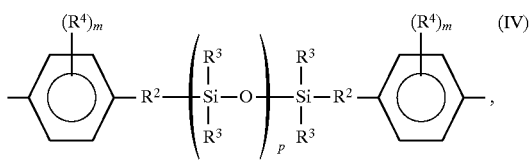

$R^2$ is $C_{2-6}$ alkylene or O, $R^3$ is $C_{1-4}$ primary or secondary alkyl or fluoroalkyl or phenyl, $R^5$ is $C_{1-4}$ alkyl or alkoxy, m is 0–2, n is in the range of about 4–25 and p has an average value from 1 to 100; and, optionally, (C) structural units of the formula

wherein each of $A^1$ and $A^2$ is independently unsubstituted or substituted m- or p-phenylene and Y is a single bond or a linking group wherein 1 or 2 atoms separate $A^1$ from $A^2$.

Another aspect of the invention is an optical data-recording medium comprising a copolycarbonate as described hereinabove.

DETAILED DESCRIPTION; PREFERRED EMBODIMENTS

A major beneficial property of the copolyestercarbonates of this invention is low intrinsic birefringence. For the most part, the intrinsic birefringences of said copolyestercarbonates are no higher than 0.15. By contrast, a bisphenol homopolycarbonate has an intrinsic birefringence of 0.25, and a typical copolyestercarbonate containing SBI and bisphenol A carbonate units and dodecanedicarboxylate ester units has an intrinsic birefringence on the order of 0.10.

For the most part, the copolyestercarbonates of the invention also have lower glass transition temperatures than SBI copolycarbonates having similar intrinsic birefringences. Typical glass transition temperatures for the copolyestercarbonates of the invention range from 135° C. to 161° C., while corresponding SBI copolyestercarbonates can have glass transition temperatures on the order of 170° C. or higher. At identical proportions of structural units, the copolyestercarbonates of the invention generally have substantially lower glass transition temperatures than the corresponding SBI copolyestercarbonates. These glass transition temperatures, combined with the thixotropic behavior previously described, make the copolyestercarbonates of the invention easily processable.

As will be apparent from the summary of the invention, essential components of the copolyestercarbonates of the invention are A units having formula 1, said units being derived from 1,1,3-trimethyl-3-(4-hydroxyphenyl)-5-hydroxyindane or the isomeric 6-hydroxyindane. These two compounds will hereinafter sometimes be designated "CD-1" and "CD-2" respectively, by reason of their structural identities as cyclic dimers of 4-isopropenylphenol.

CD-1 may be prepared by self-condensation of 4-isopropenylphenol in the presence of a boron trifluoride etherate as disclosed in U.S. Pat. No. 3,288,864. It may also be recovered as a by-product from the synthesis of 2,2-bis(4-hydroxyphenyl)propane, or "bisphenol A", from phenol and acetone. CD-2 may be prepared by the reaction of phenol and acetic acid with 4-methyl-3-pentene-2-one in the presence of hydrogen chloride gas, as disclosed in Tagle et al., *Polymer Bulletin*, 28, 645–652 (1992).

Also essential are B units. These may be selected from the group consisting of: resorcinol carbonate units or alkylene carbonate units, the latter being illustrated by units derived from $C_{4-25}$ diols such as 1,4-butanediol, 1,4-hexanediol, neopentyl glycol and glyceryl monostearate; ester units containing a radical of formula III wherein n is in the range of about 4–20 and preferably about 6–18; and carbonate units containing a radical of formula IV wherein p has an average value from 1 to 100 and usually from 5 to 40, m is 0–2 and preferably 1, $R^2$ is $C_{2-6}$ alkylene or O and preferably trimethylene, and $R^3$ is $C_{1-4}$ primary or secondary alkyl or fluoroalkyl or phenyl and preferably methyl. The preferred B units are resorcinol carbonate, eugenol polysiloxanecarbonate (in which $R^2$ has formula IV wherein $R^2$ is trimethylene, $R^3$ is methyl, $R^4$ is methoxy, m is 1 and the methoxy group is in the meta position with respect to the alkylenesiloxy chain) and dodecanedioate (in which $R^1$ has formula III wherein n is 10).

In addition, bisphenol carbonate C units of formula V may be present. The $A^{1-2}$ values therein are m- or p-phenylene radicals which may be substituted but are usually unsubstituted. The Y value is a single bond or a divalent radical in which one or two atoms, preferably one, separate $A^1$ from $A^2$; it is usually a hydrocarbon radical such as methylene, isopropylidene or ethylene but can be a radical containing atoms other than carbon and hydrogen. Examples are substituted radicals such as 2,2-dichloroethylidene and hetero atom-containing radicals such as oxy, thio, sulfoxy and sulfone. The preferred carbonate units of formula V are bisphenol A carbonate units in which each of $A^1$ and $A^2$ is p-phenylene and Y is isopropylidene.

The proportions of the A, B and C units embrace numerous copolymers which have been determined, by preparation and measurement for a substantial number of the specific copolyestercarbonates of the invention, to have an orientational birefringence of zero or nearly zero. An illustrative polymer of the invention consists of 72 mole percent CD-1 units, 10 mole percent B units wherein $R^2$ has formula III and n is 10, and 18 mole percent C units of formula V wherein $A^1$ and $A^2$ are each p-phenylene and Y is isopropylidene. Preferably, the copolyestercarbonates comprise about 70–85 mole percent of units of formula I and about 5–25 mole percent of units of formula II. When present, the units of formula V are typically in the amount of about 15–25 mole percent.

The copolyestercarbonates of this invention may be prepared by conventional polycarbonate synthesis methods such as interfacial, transesterification and redistribution methods, or by solid state polymerization as described for example, in U.S. Pat. Nos. 4,948,871, 5,204,377, 5,266,659 and 5,288,838, the disclosures of which are incorporated by reference herein. These methods are the subject of many issued patents and publications, and need not be described in detail herein. Ester units, such as those of formula II in which $R^1$ has formula III, may be incorporated in the polycarbonate by the use of a corresponding dicarboxylic acid chloride in an interfacial procedure or the use of a dialkyl or diaryl, most often a diphenyl, ester of said acid in a melt or solid state procedure.

It is believed, on the basis of nuclear magnetic resonance spectroscopic evidence, that copolyestercarbonates of this invention prepared by transesterification have a more random distribution of the A, B and C units than those prepared interfacially. The latter appear to have molecular structures characterized in part by blocks of A, B and/or C units of significant length.

The preparation of the copolyestercarbonates of this invention is illustrated by the following examples. All percentages are by weight. Molecular weights are weight average and were determined by gel permeation chromatography.

EXAMPLE 1

A 500-ml Morton flask was charged with 13.4 g (50 mmol) of CD-1, 2.9 g (12.5 mmol) of 1,12-dodecanedioic acid, 250 mg (1.1 mmol) of p-cumylphenol, 120 ml of methylene chloride, 50 ml of water, 0.5 ml of a 75% (by weight) aqueous methyl tri-n-butylammonium chloride and 125 microliters of triethylamine. Phosgene was passed into the mixture at 0.25 g/min. The pH was maintained at 8.0, by addition of 25% aqueous sodium hydroxide solution, until 5.3 g of phosgene had been introduced, and was then raised to 10.5 and an additional 2.2 g of phosgene was added. The organic solution was separated, washed with 1M aqueous hydrochloric acid solution and three times with water. It was then added to boiling water to precipitate the desired copolyestercarbonate which was filtered and dried. It had a molecular weight of 71,000 and a glass transition temperature of 139° C.

A film of the copolyestercarbonate was cast from chloroform and its birefringence was measured and found to be significantly lower than that of a bisphenol A homopolycarbonate.

EXAMPLE 2

A 30-l stirred tank reactor was charged with 968 g (3.612 moles) of CD-1, 206 g (903 mmol) of bisphenol A, 115.5 g (502 mmol) of 1,12-dodecanedioic acid, 10.7 g (50 mmol) of p-cumylphenol, 35.5 ml of a 75% aqueous methyl tri-n-butylammonium chloride solution, 10.5 l of methylene chloride and 4.5 l of water. Phosgene, 596 g (6.02 moles), was passed into the mixture, with stirring; the pH was maintained at 7.5–8.0 by addition of 25% aqueous sodium hydroxide solution until 70% of the stoichiometric amount of phosgene had been introduced and subsequently at 10.5. Triethylamine, 7.6 g, was then added and an additional 226 g of phosgene was introduced to complete the reaction. The organic solution was removed, washed once with 1M aqueous hydrochloric acid solution and three times with water, after which it was poured into methanol to precipitate the desired copolyestercarbonate. The product had a molecular weight of 143,000 and a glass transition temperature of 161° C.

Injection molded parts of the copolyestercarbonate were found to have an intrinsic birefringence of 0.11, as compared to 0.25 for a bisphenol A homopolycarbonate.

EXAMPLE 3

A 1-liter glass melt polymerization reactor, which had been previously passivated by acid washing, rinsing and overnight drying at 70° C., was charged with 83.0 g (387.6 mmol) of diphenyl carbonate, 45 g (159.5 mmol) of CD-1, 50.1 g (219.3 mmol) of bisphenol A and 7.0 g (19.9 mmol) of diphenyl 1,12-dodecanedioate. A solid nickel helixing stirrer was suspended in the powder and the vessel was evacuated and purged with nitrogen three times.

The vessel was heated at 180° C., whereupon the reaction mixture melted. Upon complete melting, it was allowed to thermally equilibrate for 5–10 minutes and there were added 600 microliters of tetramethylammonium hydroxide in the form of a 0.221M aqueous solution and 500 microliters of sodium hydroxide in the form of a 0.001M aqueous solution were added, with stirring.

Stirring was continued as the mixture was heated at 180° C. for 5 minutes. The temperature was then raised to 210° C. and the pressure lowered to 180 torr, whereupon phenol began to distill from the reactor. After 25 minutes, the pressure was lowered further to 100 torr and heating at that pressure was continued for 45 minutes, with continued distillation of phenol. Oligomerization conditions of 240° C./15 torr (45 minutes) and 270° C./2 torr (10 minutes) were maintained.

The product was the desired copolyestercarbonate oligomer having a molecular weight of 5,400. It could be converted to a high molecular weight polycarbonate having low intrinsic birefringence by subjection to molecular weight building conditions of 300° C./0.9 torr for about 75 minutes.

What is claimed:

1. A copolyestercarbonate having low birefringence, said copolyestercarbonate comprising:

(A) about 20–90 mole percent of structural units of the formula

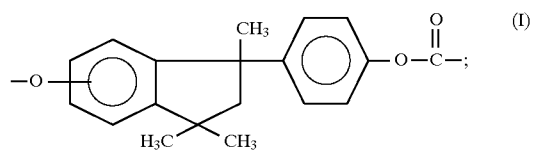

(B) about 3–70 mole percent of structural units of the formula

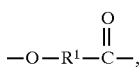

wherein $R^1$ is alkyleneoxy, m-phenyleneoxy,

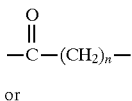

or

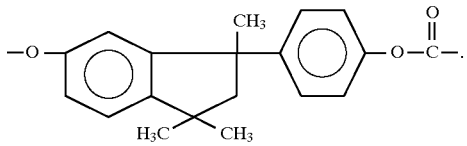

$R^2$ is $C_{2-6}$ alkylene or O, $R^3$ is $C_{1-4}$ primary or secondary alkyl or fluoroalkyl or phenyl, $R^5$ is $C_{1-4}$ alkyl or alkoxy, m is 0–2, n is in the range of about 4–25 and p has an average value from 1 to 100; and, optionally, (C) structural units of the formula

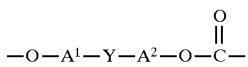

wherein each of $A^1$ and $A^2$ is independently unsubstituted or substituted m- or p-phenylene and Y is a single bond or a linking group wherein 1 or 2 atoms separate $A^1$ from $A^2$.

2. A copolyestercarbonate according to claim 1 wherein said A units have the formula 3. A copolyestercarbonate according to claim 2 comprising about 70–85 mole percent of A units and about 5–25 mole percent B units of formula II wherein $R^1$ has formula III and n is in the range of about 6–18.

4. A copolyestercarbonate according to claim 3 wherein n is 10.

5. A copolyestercarbonate according to claim 4 comprising 80 mole percent A units and 20 mole percent B units.

6. A copolyestercarbonate according to claim 3 further comprising C units of formula V.

7. A copolyestercarbonate according to claim 6 wherein n is 10, $A^1$ and $A^2$ are each p-phenylene and Y is isopropylidene.

8. A copolyestercarbonate according to claim 7 comprising 72 mole percent A units, 10 mole percent B units and 18 mole percent C units.

9. A copolyestercarbonate according to claim 2 prepared by interfacial polymerization.

10. A copolyestercarbonate according to claim 2 prepared by transesterification.

11. A copolyestercarbonate according to claim 2 prepared by redistribution.

12. A copolyestercarbonate according to claim 2 prepared by solid state polymerization.

13. An optical data recording medium comprising a copolyestercarbonate according to claim 1.

* * * * *